G. H. CRAWFORD & G. H. SAUER.
SPRING WHEEL.
APPLICATION FILED JUNE 29, 1910.
986,549.
Patented Mar. 14, 1911.
2 SHEETS—SHEET 1.
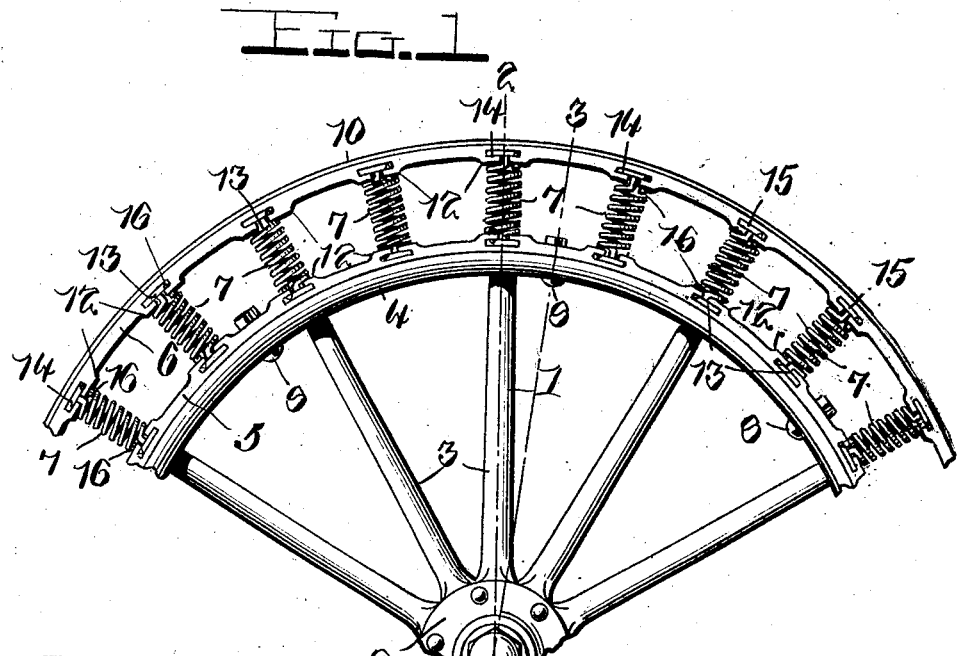
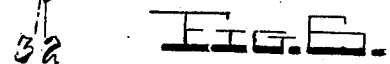
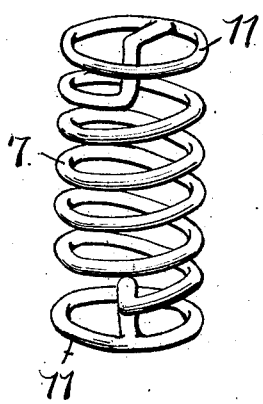
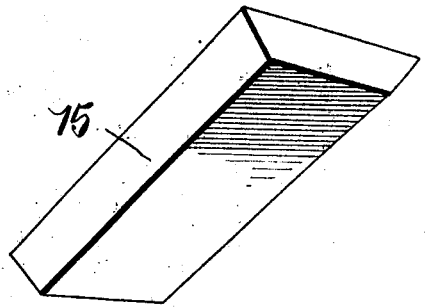
Witnesses
Chas. L. Grieshaver.
H. S. McSway
Inventors
G. H. Crawford and
G. H. Sauer;
By Watson E. Coleman
Attorney

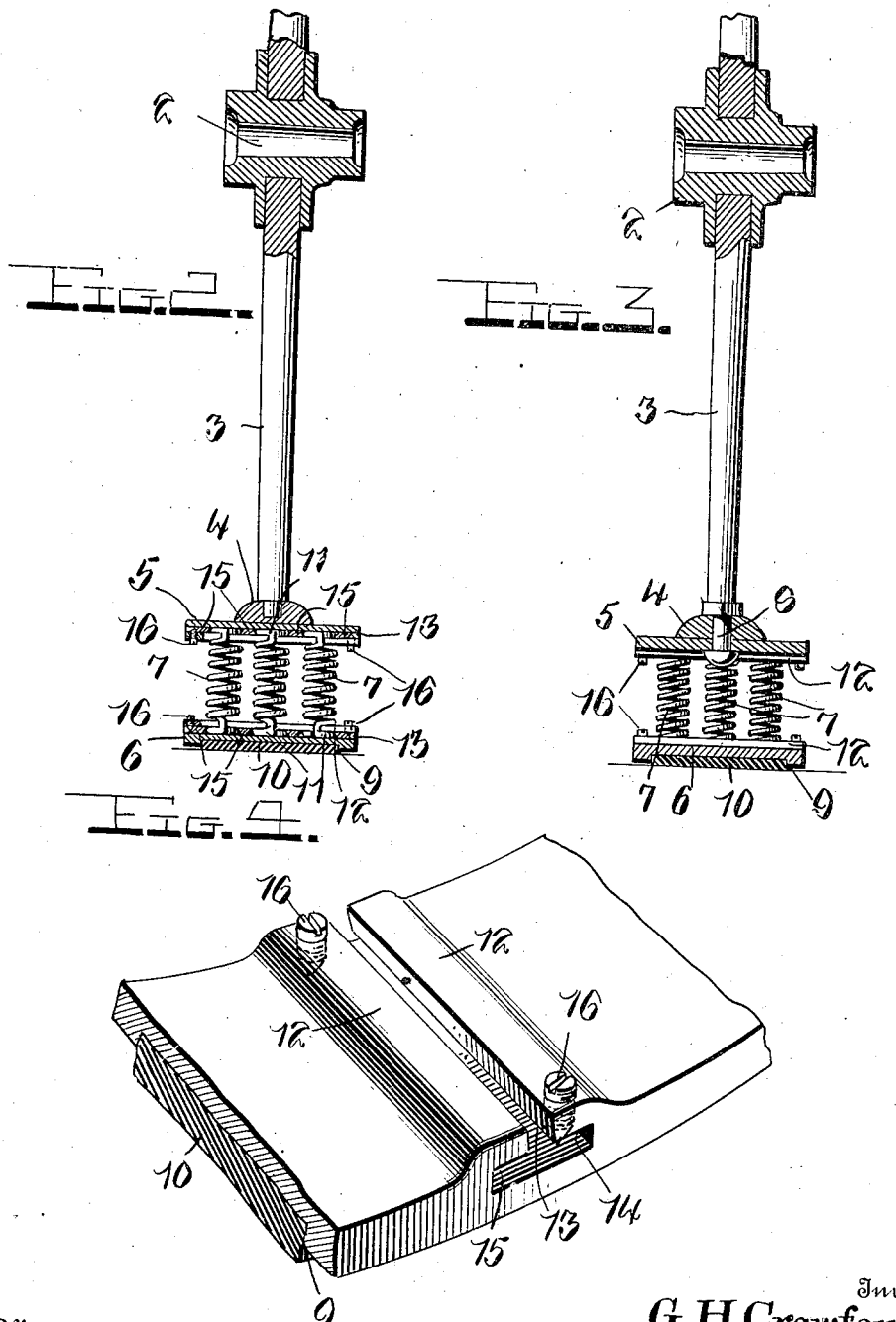

UNITED STATES PATENT OFFICE.

GUY H. CRAWFORD AND GEORGE H. SAUER, OF DENVER, COLORADO, ASSIGNORS TO THE CRAWFORD-SAUER SPRING TIRE COMPANY, A CORPORATION OF COLORADO.

SPRING-WHEEL.

986,549.  Specification of Letters Patent.  Patented Mar. 14, 1911.

Application filed June 29, 1910. Serial No. 569,802.

*To all whom it may concern:*

Be it known that we, GUY H. CRAWFORD and GEORGE H. SAUER, citizens of the United States, residing at Denver, in the county of Denver and State of Colorado, have invented certain new and useful Improvements in Spring-Wheels, of which the following is a specification, reference being had to the accompanying drawings.

This invention relates to improvements in spring or resilient wheels and more particularly to a spring tire adapted to be used in place of the ordinary pneumatic tire.

The object of the invention is to provide a spring wheel of this character having an improved spring supported rim or tire and improved means for arranging and securing the springs between the inner and the outer sections of the rim or tire.

With the above and other objects in view, the invention consists of the novel features of construction and the combination and arrangement of parts hereinafter fully described and claimed, and illustrated in the accompanying drawings, in which—

Figure 1 is a detail side view of a portion of a spring wheel constructed in accordance with the invention, parts being broken away; Figs. 2 and 3 are detail sectional views, taken respectively on the planes indicated by the lines 2—2 and 3—3 in Fig. 1; Fig. 4 is a perspective view of a portion of one of the rim sections; Fig. 5 is a detail view of one of the springs; and Fig. 6 is a detail view of one of the spring spacing blocks.

Referring more particularly to the drawings 1 denotes a portion of a wheel having a hub 2, radiating spokes 3 and an annular rim 4. The improved spring tire is adapted to be secured to the rim 4 and comprises inner and outer annular sections 5, 6 between which are arranged at suitable intervals transversely extending series of coil springs 7. The inner section 5 is here shown as secured by bolts or similar fastenings 8 to the rim 4 and it is of considerably greater width than said rim, as shown in Figs. 2 and 3. The outer section 6 is likewise of considerable width to give a broad tread surface to the wheel and thereby increase its traction power and prevent slipping. The outer section 6 has preferably formed in its outer face an annular groove or seat 9 to receive a flat tread or tire member 10 of leather, rubber or other material which will tend to prevent noise.

The springs 7 are arranged in transverse rows at suitable intervals, three springs being preferably arranged in each row and at the ends of said springs are formed circular loops 11 disposed in transverse parallel planes. To permit these springs to be attached to the two sections 5, 6 and so mounted that they may be removed and replaced when damaged, the opposing faces of the tire sections 5, 6 are formed at intervals with transversely extending ribs or enlargements 12 in which latter are formed grooves 13 for the reception of the loop-shaped ends 11 of the springs. The grooves 13 extend, of course, transversely of the tire and their walls are undercut, as shown at 14, so that the springs will be prevented from being pulled or pushed out of them in a radial direction. For the purpose of maintaining the three springs of each transverse row or series in spaced relation and preventing the springs from slipping out of the ends of the grooves 13, spacing and retaining blocks 15 are provided. Four of these blocks are provided in each of the grooves 13, the two intermediate ones being arranged between the springs to maintain them in spaced relation while the two outer ones are retained in position by suitable clamping devices which may be in the form of set screws 16, if desired. The end portions of the blocks slide in the undercut portions 14 of the grooves 13 and their side edges may be beveled, as shown in Fig. 2, to cause them to more effectively engage and retain the end loops 11 of the springs. If desired, the inner ends of the set screws 16 may be tapered so that when said screws are tightened they will tend to securely clamp all of the parts in the grooves.

The inner and outer tire sections 5, 6 are preferably constructed of resilient metal and by making it with the enlargements 12 which are of less thickness, the resiliency of the outer tire section 6 will tend to prevent shocks and jars incident to travel over rough roads, from being imparted to the vehicle, said tire section 6 thus co-acting with the springs 7 in making the wheel an effective substitute for a pneumatic tired wheel.

From the foregoing it will be seen that a wheel constructed in accordance with the invention may be produced at a comparatively small cost and will be strong and durable. The construction is such that the tire may be applied to various kinds of wheels and will provide a broad substantial tread surface and have sufficient resiliency to insure comfort to the occupants of the vehicle. By employing transverse rows of springs the strain is distributed and the wheel balanced, and by removably mounting said springs as above set forth, they may be quickly and easily removed and replaced when weakened or when broken or otherwise damaged.

Various changes in the form, proportion and arrangement of parts may be resorted to within the spirit and scope of the invention.

We claim:

1. In a spring wheel, inner and outer annular sections provided in their opposing faces with transversely arranged undercut grooves, transversely arranged series of coil springs having ends removably arranged in said grooves, and blocks arranged in said grooves to space the springs apart and retain them in position.

2. In a spring wheel, the combination of a wheel rim, inner and outer annular tire sections formed in their opposing faces with transversely extending undercut grooves, the inner tire section being secured to said rim and the outer tire section having an annular seat in its outer face, a flat tread band of cushioning material arranged in said seat in the outer tire section, transversely arranged series of coil springs provided at their ends with loops to slide into the transverse grooves in the two tire sections, spacing blocks arranged in the grooves between the loop-shaped ends of said springs to space the springs apart, retaining blocks arranged in the end portions of the grooves to engage the outermost springs of each series and retain the parts in said grooves, and set screws in the inner and outer tire sections to engage the retaining blocks.

In testimony whereof we hereunto affix our signatures in the presence of two witnesses.

GUY H. CRAWFORD.
GEORGE H. SAUER.

Witnesses:
MABEL E. STRAW,
LILLIAN S. ELLSWORTH.